United States Patent [19]

Khanarian et al.

[11] Patent Number: 4,865,406
[45] Date of Patent: Sep. 12, 1989

[54] FREQUENCY DOUBLING POLYMERIC WAVEGUIDE

[75] Inventors: Garo Khanarian, Berkley Heights, N.J.; David R. Haas, New York, N.Y.

[73] Assignee: Hoechst Celanese Corp., Somerville, N.J.

[21] Appl. No.: 269,802

[22] Filed: Nov. 9, 1988

[51] Int. Cl.$^4$ .............................. G02B 6/00; G02F 1/35
[52] U.S. Cl. ................................ 350/96.12; 350/96.34; 307/430
[58] Field of Search .............. 350/96.11, 96.12, 96.13, 350/96.14, 96.15, 96.29, 96.34; 307/425, 426, 427, 428, 429, 430

[56] References Cited

U.S. PATENT DOCUMENTS

| | | | |
|---|---|---|---|
| 3,584,230 | 6/1971 | Tien | 350/96.12 X |
| 3,586,872 | 6/1971 | Tien | 350/96.12 X |
| 3,610,727 | 10/1971 | Ulrich | 350/96.12 X |
| 3,624,406 | 11/1971 | Martin et al. | 350/96.12 X |
| 3,674,335 | 7/1972 | Ashkin et al. | 350/96.19 |
| 3,688,124 | 8/1972 | Freund et al. | 307/427 |
| 3,719,411 | 3/1973 | Midwinter | 350/96.12 |
| 3,810,688 | 5/1974 | Ballman et al. | 350/96.12 |
| 3,830,555 | 8/1974 | Warner | 350/96.12 X |
| 3,842,289 | 10/1974 | Yariv et al. | 350/96.12 X |
| 3,995,936 | 12/1976 | Hepner et al. | 350/96.12 |
| 4,054,362 | 10/1977 | Baues | 350/96.14 |
| 4,767,169 | 9/1988 | Teng et al. | 350/96.12 X |
| 4,792,208 | 12/1988 | Ulman et al. | 350/96.12 X |

Primary Examiner—William L. Sikes
Assistant Examiner—Akm E. Ullah
Attorney, Agent, or Firm—DePaoli & O'Brien

[57] ABSTRACT

In one embodiment this invention provides a frequency doubling optical waveguide consisting of a substrate-supported polymeric thin film which exhibits second order nonlinear optical response, and which has a periodic structure for quasi-phase matching of propagating laser wave energy.

In a preferred embodiment the waveguide has a two-dimensional channel structure for intensified single mode wave transmission.

23 Claims, 3 Drawing Sheets

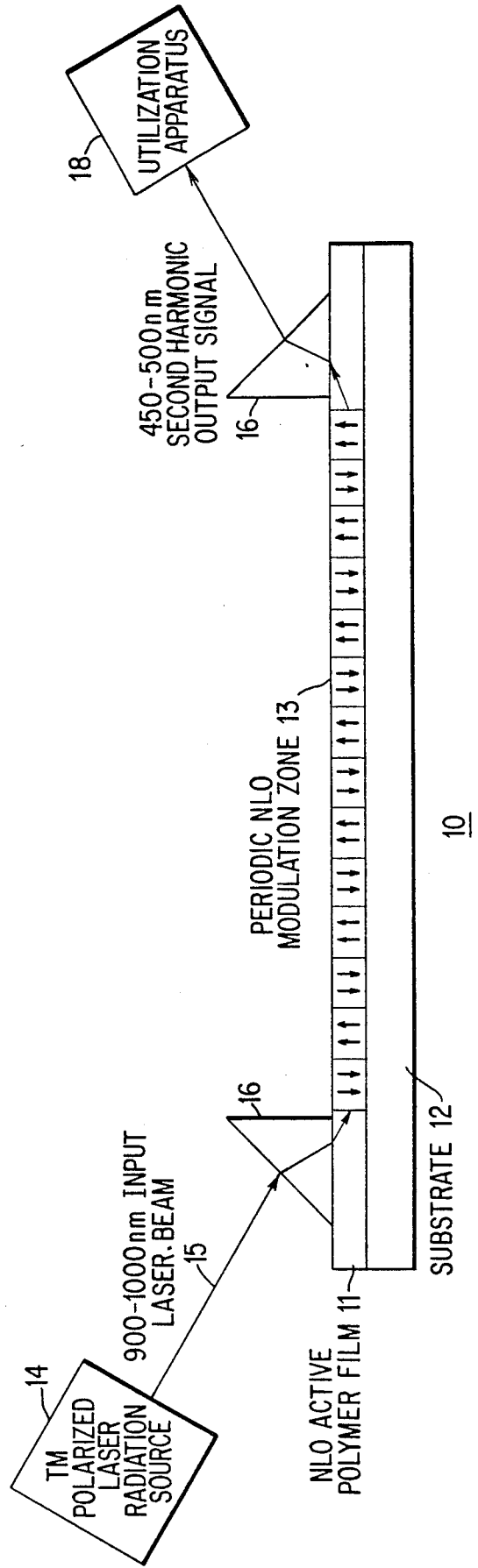

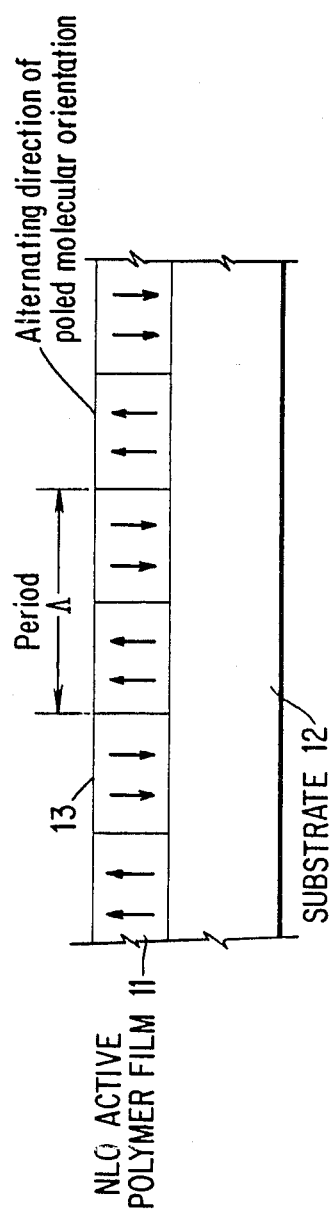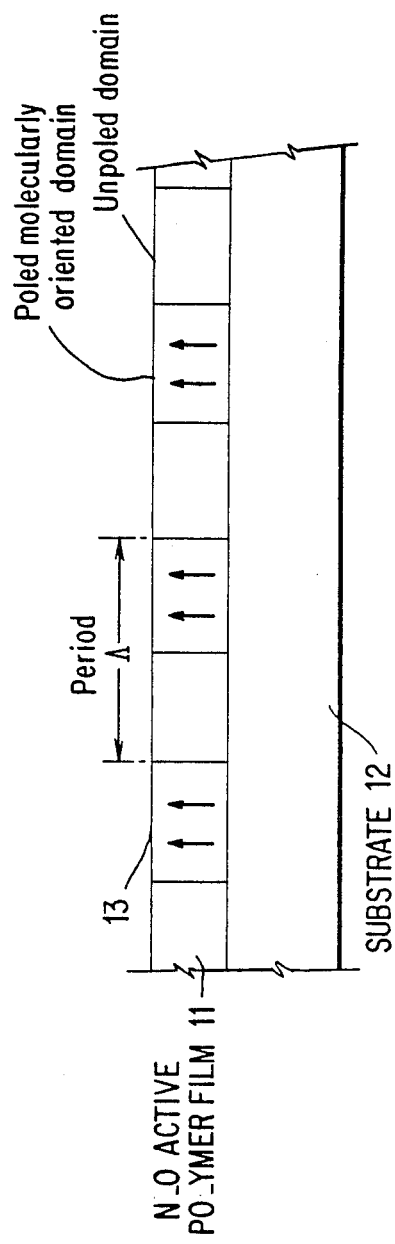
Fig.2a
Fig.2b

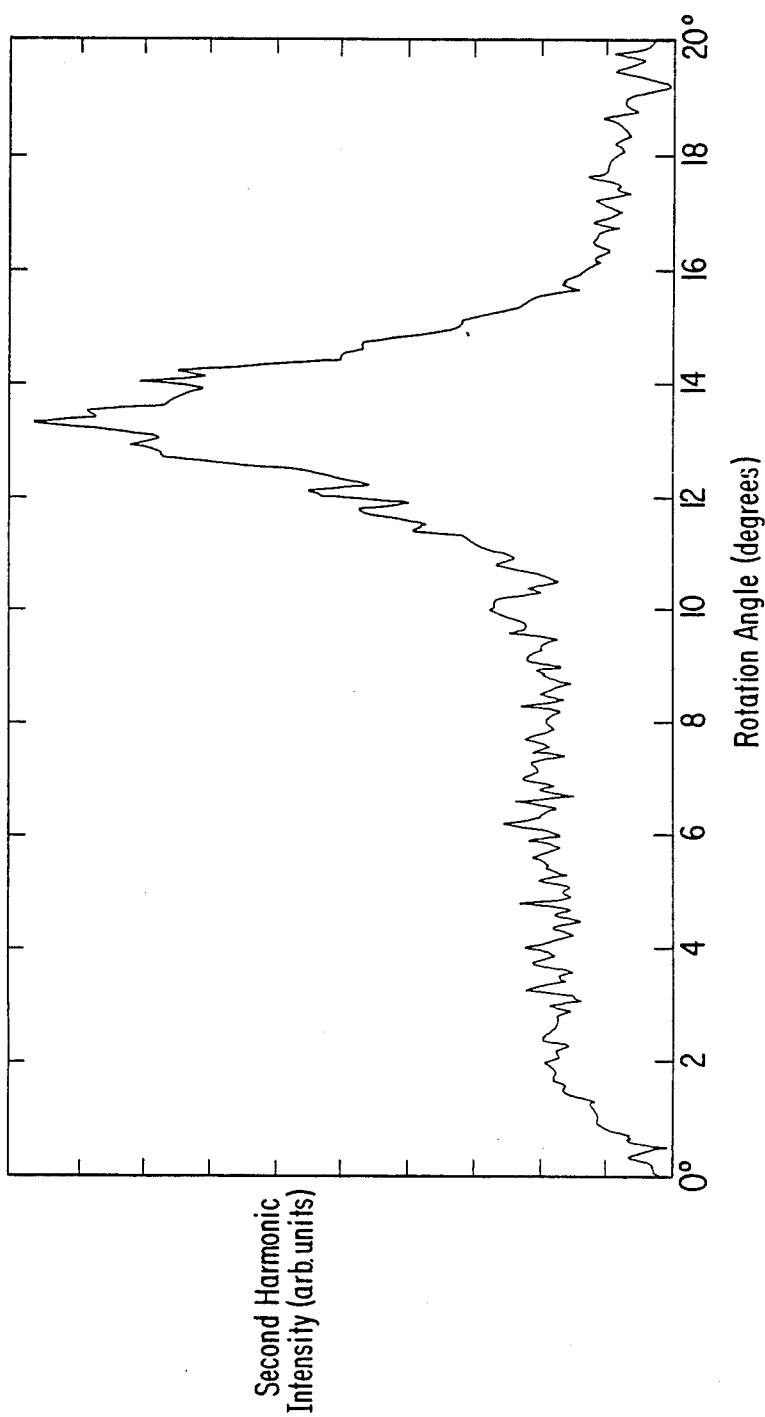

FREQUENCY DOUBLING POLYMERIC WAVEGUIDE

This invention was made with Government support under Contract No. F 49620-84-C-0110 awarded by the Department of Defense (DOD). The Government has certain rights in this invention.

BACKGROUND OF THE INVENTION

There is an increasing interest in the development of a compact diode laser source in the 400-500 nm range for advanced applications, such as the enhancement of optical disk technology through improved data storage, retrieval storage density, and data capture rates.

There are several possible approaches to a prospective short wavelength, diode laser source. The traditional diode materials such as the ternary and quaternary compounds of In, Ga, As, Al, P, and Sb do not have a direct energy gap high enough to produce a short wavelength laser. A number of other laser materials have been studied for development of diode laser sources in the blue wavelength region. These materials include II-VI semiconductors, quantum well materials, and other wide band bap semiconductors such as cadmium sulfide (CdS). Although the blue quantum well structure shortens the lasing wavelength, it requires a cryogenic condition for lasing. There also has been investigation of II-VI wide-gap superlattices with the goal of achieving diode emission in the blue-green region of the spectrum, but these materials have only produced optically pumped lasers requiring cooling at liquid nitrogen temperature. Other semiconductors that are known to lase in the 450-500 nm range are CdS, ZnSe, ZnCdS, and CdSeS. Lasers of these materials require either optical or electron beam pumping for their operation.

In view of the impracticality of a direct diode laser source, attractive alternatives involve frequency conversion of available diode laser sources, either by frequency doubling or parametric up-conversion. The traditional frequency conversion techniques utilize phase-matching of input beams and harmonic waves in second order optical crystals such as potassium dihydrogen phosphate (KDP and KD*P), LiNbO$_3$ and LiIO$_3$. However, because of the relatively low values of second order susceptibility of these crystals, and the low beam intensity of a diode laser, an exceptionally long single crystal is required to achieve appreciable power conversion to the second harmonic tensor. Such large crystal dimensions preclude the design and fabrication of a compact and ruggedized optical recording system. In addition, the provision of large inorganic crystals is difficult and costly.

In general, classical phase-matching (e.g., via angle or thermal tuning) requires a certain combination of intrinsic birefringence and dispersion of refractive indices. New small molecular weight crystralline organic nonlinear optical materials with high second harmonic susceptibility have been reported in literature such as ACS Symposium, Series No. 233, pages 1-26, 1983 by Garito et al. These organic materials usually possess high intrinsic birefringence and positive dispersion so that phase matching can be achieved with a single crystal. Even if phase matching can be achieved with the new types of organic materials having high nonlinear optical susceptibility, the low beam power of a diode laser significantly limits the power conversion efficiency.

An alternative means to achieve phase-matched conditions is the use of dispersion properties for different modes in a waveguide. Since the energy is confined laterally to a narrowly constricted space, a high light intensity is possible with a relatively low power source. In this approach, one usually excites a lower order mode of the fundamental beam and the second harmonic generated propagates in a higher order mode. If the waveguide geometry and refractive indices of the guiding region and cladding region are such that:

$$\Delta\beta = \beta_n(\omega_3) - \beta_m(\omega_2) - \beta_1(\omega_1) = 0 \qquad (1)$$

then the phase matching condition is established. Here, $\beta_i$ is the propagation constant of the i-th mode. The conversion efficiency is generally quadratically dependent on the overlap integral between the two modes;

$$\int E_n(\omega_3, z) E_m(\omega_2, z) E_1(\omega_1, z) dz$$

where E is the electric field of the mode across the waveguide. In general, the overlap between the waveguide modes is limited, and the value of the overlap integral is also small. This approach has been utilized for phase matching in waveguides derived from organic materials, as reported in Optics Commun., 47, 347 (1983) by Hewig et al. However, the level of second harmonic conversion efficiency is too low for any practical frequency doubling application.

Of particular interest with respect to the present invention is literature relating to spatially periodic nonlinear structures for frequency conversion of electromagnetic energy. The pertinent literature includes IEEE J. of Quantum Elect., QE-9 (No. 1), 9 (1973) by Tang et al; Levine et al, Appl. Phys. Lett, 26, 375(1975); Appl. Phys. Lett, 37(7), 607(1980) by Feng et al; and U.S. Pat. Nos. 3,384,433; 3,407,309; 3,688,124; 3,842,289; 3,935,472; and 4,054,362.

The thin film waveguides with a periodically modulated nonlinear optical coefficient as described in the literature of interest are either inorganic optical substrates with disadvantages as previously described; or they are organic materials which are in the liquid phase, such as a liquid crystal medium or a thin film of nitrobenzene which require a continuously applied external DC electric field.

There is continuing interest in the development of a short wavelength laser module suitable for a transportable optical disk data recording system.

Accordingly, it is an object of this invention to provide a short wavelength laser source by the frequency doubling of an input laser beam.

It is another object of this invention to provide a short wavelength laser source by efficient frequency conversion of an input long wavelength laser beam in an organic nonlinear optical wavelength.

It is a further object of this invention to provide an all-optical polymeric nonlinear optical waveguide with a spatial periodic structure for modulation of second order susceptibility, and quasi-phase matching for frequency doubling of an input 700-1300 nm laser beam.

Other objects and advantages of the present invention shall become apparent from the accompanying description and drawings.

DESCRIPTION OF THE INVENTION

One or more objects of the present invention are accomplished by the provision of a parametric frequency converting device which comprises a thin film waveguide of a polymeric medium which exhibits second order nonlinear optical response, and which has a periodic structure for quasi-phase matching of a propagating laser beam.

In another embodiment this invention provides a nonlinear optical waveguide device for frequency doubling of a 700–1300 nm laser beam which comprises a thin film of a polymeric medium which exhibits second order nonlinear optical response, and which has a spatial periodic structure for quasi-phase matching of propagating wave energy; wherein the coherence length $l_c$ of the periodic polymeric medium is defined by the equation:

$$l_c = (\pi/\Delta\beta)$$

where $\Delta\beta$ is the propagation constant difference which is equal to $\beta_o(2\omega_1) - 2\beta_o(\omega_1)$, $\omega_1$ is the fundamental frequency, and subscript zero denotes the zero-ordered mode in the waveguide.

In another embodiment this invention provides a nonlinear optical waveguide device for frequency doubling of a 700–1300 nm laser beam which comprises a thin film of a polymeric medium which exhibits second order nonlinear optical response, and which has a spatial periodic structure for quasi-phase matching of propagating wave energy; wherein the coherence length $l_c$ of the periodic polymeric medium is defined by the equation:

$$l_c = (\pi/\Delta\beta)$$

where $\Delta\beta$ is the propagation constant difference which is equal to $\beta_o(2\omega_1) - 2\beta_o(\omega_1)$, $\omega_1$ is the fundamental frequency, and subscript zero denotes the zero-ordered mode in the waveguide; and wherein the polymeric medium comprises a polymer having side chains which exhibit second order nonlinear optical susceptibility and consist of at least 25 weight percent of the polymer, and the side chains have an external field-induced molecular orientation orthogonal to the waveguide plane.

The polymeric thin film typically is in the form of a coating on a support substrate.

Preferably the thin film is composed of a thermoplastic side chain polymer having a main chain selected from polyvinyl, polysiloxane, polyoxyalkylene, polyester or polyamide structures.

In another embodiment this invention provides a frequency converting module for producing a short wavelength laser beam which comprises:

a. a 700–1300 nm laser generating source, in coupled combination with
b. an optical waveguide comprising a substrate-supported thin film of a polymeric medium which exhibits second order nonlinear optical response, and which has a spatial periodic structure for quasi-phase matching of propagating wave energy; wherein the coherence length $l_c$ of the periodic polymeric medium is defined by the equation:

$$l_c = (\pi/\Delta\beta)$$

where $\Delta\beta$ is the propagation constant difference which is equal to $\beta_o(2\omega_1) - 2\beta_o(\omega_1)$, $\omega_1$ is the fundamental frequency, and subscript zero denotes the zero-ordered mode in the waveguide; and wherein the polymeric medium comprises a polymer having side chains which exhibit second order nonlinear optical susceptibility and consist of at least 25 weight percent of the polymer, and the side chains have an external field-induced molecular orientation orthogonal to the waveguide plane.

In a further embodiment this invention provides a process for providing a short wavelength laser source which comprises (1) introducing a 700–1300 nm laser beam into an optical waveguide comprising a substrate-supported thin film of a polymeric medium which exhibits second order nonlinear optical response, and which has a spatial periodic structure for quasi-phase matching of propagating wave energy; wherein the coherence length $l_c$ of the period polymeric medium is defined by the equation:

$$l_c = (\pi/\Delta\beta)$$

where $\Delta\beta$ is the phase constant difference which is equal to $\beta_o(2\omega_1) - 2\beta_o(\omega_1)$, $\omega_1$ is the fundamental frequency, and subscript zero denotes the zero-ordered mode in the waveguide; and wherein the polymeric medium comprises a polymer having side chains which exhibit second order nonlinear optical susceptibility and consist of at least 25 weight percent of the polymer, and the side chains have an external field-induced molecular orientation orthogonal to the waveguide plane; and (2) doubling the frequency of the propagating wave energy to provide an output 350–650 nm laser beam.

When the input laser beam power is between about 0.1–1 watt, the output laser beam power is at least about one milliwatt.

The input laser beam typically is in a transverse magnetic (TM) polarization mode, and the propagating mode of the input wave energy is zero-ordered.

A present invention optical frequency converter can be designed with the following material specifications:

| | |
|---|---|
| Nonlinear optical susceptibility $\chi^{(2)}$ | $1 \times 10^{-8}$ esu |
| Coherence length | 9.5 μm |
| Refractive index | 1.58 |
| Absorption cut-off frequency | 450 nm |

A present invention optical frequency conversion system is characterized by efficient frequency doubling of input laser wave energy, confinement of the propagating wave energy for provision of a high powder density, and quasi-phase matching between the fundamental and harmonic frequencies.

BRIEF DESCRIPTION OF THE DRAWING

Referring to the drawings,

FIG. 1 is a perspective view of a frequency doubling polymeric thin film waveguide in accordance with the present invention.

FIG. 2 is a representation of side view sections of a FIG. 1 type waveguide thin film, illustrating alternating poled molecularly oriented domains in one section, and poled molecularly oriented domains alternating with unpoled domains in the other section.

FIG. 3 is a graphic plot of phase matched second harmonic generation with a periodically poled waveguide as described in Example I.

Thin film waveguide 10 in FIG. 1 is a composite construction of substrate 12 which supports nonlinear optically active polymer film 11. A linear section of polymer film 11 consists of periodic nonlinear optical modulation zone 13. In FIG. 2 two different periodic domain configurations are illustrated for zone 13.

In practice thin film waveguide 10 is utilized in combination with transverse magnetic (TM) polarized laser radiation source 14 which provides 700–1300 nm input laser beam 15, a pair of prism coupling means 16 which couple laser beam 15 to polymer film 11; and utilization apparatus 18, such as an optical disk data recording unit.

The input TM polarized coherent electromagnetic radiation preferably is a laser beam such as that generated by a diode laser with a wavelength in the 700–1300 nm range.

The coupling means can consist of a pair of prism couplers, such as Schott $SF_6$ optical glass with a high index of refraction. Optical coupling and decoupling also can be accomplished with optical diffraction gratings which are formed directly on the surface of the thin film waveguide, as described in U.S. Pat. Nos. 3,674,335; 3,874,782; and 3,990,775. Another coupling means is through the cleaved end faces of a waveguiding structure.

The substrate 12 as illustrated in FIG. 1 can be constructed of any convenient non-conducting medium such as plastic, glass, or silicon.

The polymeric thin film waveguiding medium of the invention optical frequency converting device is transparent, either liquid crystalline or isotropic in physical properties, and exhibits nonlinear optical response. The polymer medium has a higher refractive index (e.g., 1.5) than the supporting substrate, or higher than the cladding layer (e.g., sputtered silica) if one is composited between the polymer medium and the supporting substrate.

The transparent polymer medium can be applied to the supporting substrate by conventional methods, such as spin coating, spraying, Langmuir-Blodgett deposition, and the like.

The term "transparent" as employed herein refers to a polymeric thin film waveguide medium which is transparent or light transmitting with respect to incident fundamental and created light frequencies. In a present invention frequency converting waveguide device, the polymeric thin film nonlinear optical medium is transparent to both the incident and exit light frequencies.

The term "isotropic" as employed herein refers to a transparent polymeric thin film waveguide medium in which the optical properties are equivalent in all tensor directions.

The term "external field" as employed herein refers to an electric, magnetic or mechanical stress field which is applied to a substrate of mobile polymer molecules, to induce dipolar alignment of the polymer molecules parallel to the field.

A present invention polymeric thin film waveguide medium preferably is a polymer having a comb structure of side chains which exhibit nonlinear optical response. This type of chemical structure is illustrated by thermoplastic polymers which are characterized by a recurring monomeric unit corresponding to the formula:

where P' is a polymer main chain unit, S' is a flexible spacer group having a linear chain length of between about 0–20 atoms, M' is a pendant group which exhibits second order nonlinear optical susceptibility, and where the pendant groups comprise at least about 25 weight percent of the polymer, and the polymer has a glass transition temperature or softening point above about 40° C.

Among the preferred types of side chain polymers are those characterized by a recurring monomeric unit corresponding to the formula:

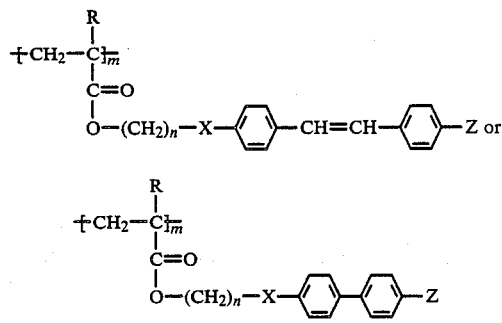

where m is an integer of at least 5; n is an integer between about 4–20; X is —NR—, —O— or —S—; R is hydrogen or a $C_1$–$C_4$ alkyl; and Z is —$NO_2$, —CN or —$CF_3$.

Side chain polymers of interest are described in U.S. Pat. No. 4,694,066. Illustrative of side chain polymer species are poly[6-(4-nitrobiphenyloxy)hexyl methacrylate], poly(L-N-p-nitrophenyl-2-piperidinemethyl acrylate), and stilbene-containing polymers such as:

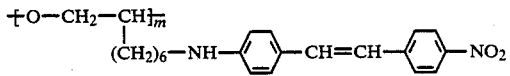

A critical aspect of the present invention frequency converting waveguide is the periodic nonlinear optical modulation zone 12 represented in FIG. 1. The periodicity of a waveguide NLO modulation zone preferably is accomplished by poling with an electric field to achieve molecular orientation of the polymer side chains parallel to the direction of the electric field. The poling induces a macroscopic noncentrosymmetry in the poled domains of the polymer medium, and establishes second order nonlinear optical susceptibility in the polymer medium.

Poling of a thin film waveguide medium can be accomplished conveniently by heating the medium near or above its melting point or glass transition temperature, then applying a DC electric field (e.g., 50–150 V/$\mu$m) to the medium to align molecular dipoles in a uniaxial orientation. The medium then is cooled while the medium is still under the influence of the applied DC electric field. In this manner a stable and permanent molecular orientation is immobilized in a rigid structure within the poled domains.

The poling can be applied to a polymer medium that is substrate-supported, by an appropriate placement of an upper and lower pair of electrodes, at least one of which has a grating configuration.

The following example is further illustrative of the present invention. The device components are presented as being typical, and various modifications in design and operation can be derived in view of the foregoing disclosure within the scope of the invention.

EXAMPLE I

This Example illustrates the construction and operation of an optical frequency converting waveguide module in accordance with the present invention.

A silicon dioxide-coated silicon wafer with a grating electrode is constructed by means of the following fabrication procedures.

A commercially available silicon dioxide-coated silicon wafer is placed in a Varian electron beam vacuum deposition system. A 0.1 μm layer of 99.999% purity aluminum is deposited on the wafer.

AZ-1518 positive photoresist (Hoechst) is spin-coated on the aluminum-coated wafer with a Solitec model 5100 coater. A 1.5 μm photoresist coating is achieved by spinning at 5000 rpm for 30 seconds. The photoresist coating is dried in a vacuum oven at 90° C. for 30 minutes.

The photoresist coating is patterned by placing the wafer in contact with a mask of the desired configuration in a Karl Suss model MJB3 mask aligner, and exposing the masked coating to 405 μm radiation (70 mJ/cm$^2$).

The mask is removed, and a thin piece of silicon (1 cm×2 cm) is placed on the surface of the patterned photoresist as a protective shield, and the combination is exposed to 70 mJ/cm$^2$ of 405 μm radiation. The patterned photoresist is developed with AZ Developer in water (1:1) over a period of 60 seconds, and the developing cycle is terminated by washing with deionized water.

The photoresist-coating of the wafer is baked in a vacuum oven at 120° C. for 45 minutes. The exposed aluminum pattern is etched with type A etchant (Transene Corp.) at 50° C. for 20 seconds, and the etched surface is rinsed with deionized water.

The aluminum grating electrode surface of the wafer then is covered with a 1.5 μm cladding layer of 20% polyvinyl alcohol (75% hydrolyzed) in water by spin-coating at 5000 rpm for 30 seconds, and the cladding layer is dried in a vacuum oven at 110° C. for two hours.

A nonlinear optically active organic layer of 1.65 μm thickness is spin-coated on the cladding layer at 3000 rpm. The spin-coating medium is a 20% solution of a copolymer (50/50) of methyl methacrylate/4-(methacryloyloxy-2-hexoxy)-4'-nitrostilbene in trichloropropane. The organic layer is dried in a vacuum oven at 160° C. for one hour.

An upper cladding layer of 1.5 μm thickness is added by spin-coating a medium of polysiloxane (GR-651-L, Owens-Illinois Inc., 25% solids in 1-butanol) at 3500 rpm for 30 seconds. The cladding layer is dried in a vacuum oven at 110° C. for 35 minutes. A 0.055 μm coating of aluminum is deposited as an electrode layer on the upper cladding layer.

The fabricated waveguide is placed in a Mettler hot stage, and the unit is raised to 90° C. at 1° C./min. A DC field of 70 V/μm is applied across the waveguiding organic layer for ten minutes by means of the electrodes. The electric field is maintained while the waveguide sample is cooled to room temperature at 1° C./min. The $\chi^{(2)}$ *nonlinear optical response of the waveguiding medium is* $2 \times 10^{-8}$ esu as measured at 1.34 μm excitation wavelength.

The waveguide structure is cleaved at opposite ends to provide two sharp faces to couple light in and out of the waveguiding organic layer.

Cylindrical lenses are employed to focus and couple 1.34 radiation (0.01 mJ, 10 nsec wide pulse) into the waveguide. The waveguide is situated on a rotation stage, and phase-matched second harmonic generation is observed when the waveguide is rotated until the periodicity satisfies the value for phase-matching. Under the described operating conditions, a 0.5-1% amount of the fundamental beam is converted into observed second harmonic radiation as shown in FIG. 3.

FIG. 3 illustrates the nonlinear optical response of the fabricated device upon excitation with $TM_o^\omega$ radiation. As the sample is rotated, the grating matches the required periodicity for phase-matching and the second harmonic signal increases, demonstrating that phase-matched interaction has occurred between the fundamental mode $TM_o^\omega$ and its harmonic $TM_2^{2\omega}$.

EXAMPLE II

This Example illustrates the construction and operation of a two-dimensional rib waveguide for optical frequency converting in accordance with the present invention.

Following the procedures of Example I, an oxidized silicon substrate (2 microns of SiO$_2$ on Si) is coated with an aluminum grating electrode. A thin (1000 angstroms) polysiloxane layer is spin-coated from a 7% solution at 4000 rpm and cured for 45 minutes at 110° C. A spin-coated Master Bond UV11-4M1 epoxy (Master Bond Inc.) layer 2 microns thick is deposited by spin-coating at 3000 rpm, and curing for 20 minutes under a 25 mw/cm$^2$ u.v. mercury-xenon arc lamp. The surface is treated by exposure to a 5 watt r.f. oxygen plasma in a reactive-ion-etcher for 5 seconds and is coated with a nonlinear optically active organic layer (1.25 microns) as in Example I. A second epoxy layer is applied as described above and cured for 5 minutes.

The upper cladding layer is coated with an aluminum masking layer (2000 angstroms). A narrow AZ-1518 photoresist ribbon-like strip (5.5 microns in width) is coated on the aluminum in the waveguiding direction of the laminated structure. The aluminum not covered by the photoresist is removed as in Example I. The upper surface of the waveguide structure is exposed to reactive ion etching to remove the multilayers down to the bottom polysiloxane layer, except for the photoresist coated strip. The etching cycles also remove the photoresist coating from the aluminum strip. The aluminum coating is removed from the ribbon-like strip of multilayers. The substrate and the upper surface multilayer strip are spin-coated with Master Bond UV11-4M1 epoxy at 2500 rpm, and the coating is cured by means of the above described conditions.

Following the procedures of Example I, an upper aluminum grating electrode (1000 angstroms) is constructed on the upper epoxy layer, and the nonlinear optically active polymer layer is molecularly oriented by means of a DC field applied between the electrodes.

The two endfaces in the waveguiding direction are cleaved for end-fire coupling of light into and out of the two-dimensional waveguiding channel.

The fine adjustment of the waveguide $\chi^{(2)}$ period to match the polymer channel coherence length is accomplished by electrooptic tuning of the linear refractive index by application of an electric field between the electrodes.

What is claimed is:

1. A nonlinear optical waveguide device for frequency doubling of a 700-1300 nm laser beam which comprises a thin film of a polymeric medium which exhibits second order nonlinear optical response, and which has a spatial periodic structure for quasi-phase matching of propagating wave energy, wherein the coherence length $l_c$ of the periodic polymeric medium is defined by the equation:

$$l_c = (\pi/\Delta\beta)$$

where $\Delta\beta$ is the propagation constant difference which is equal to $\beta_o(2\omega_1) - 2\beta_o(\omega_1)$, $\omega_1$ is the fundamental frequency, and subscript zero denotes the zero-ordered mode in the waveguide.

2. A nonlinear optical waveguide device for frequency doubling of a 700-1300 nm laser beam which comprises a thin film of a polymeric medium which exhibits second order nonlinear optical response, and which has a spatial periodic structure for quasi-phase matching of propagating wave energy; wherein the coherence length $l_c$ of the periodic polymeric medium is defined by the equation:

$$l_c = (\pi/\Delta\beta)$$

where $\Delta\beta$ is tne propagation constant difference which is equal to $\beta_o(2\omega_1) - 2\beta_o(\omega_1)$, $\omega_1$ is the fundamental frequency, and subscript zero denotes the zero-ordered mode in the waveguide; and wherein the polymeric medium comprises a polymer having side chains which exhibit second order nonlinear optical susceptibility and consist of at least 25 weight percent of the polymer, and the side chains have an external field-induced molecular orientation orthogonal to the waveguide plane.

3. A waveguide device in accordance with claim 2 wherein the polymeric thin film is coated on a support substrate.

4. A waveguide device in accordance with claim 2 wherein the polymeric thin film comprises a thermotropic liquid crystalline polymer having a comb structure of mesogenic side chains, and having a glass transition temperature above about 40° C.

5. A waveguide device in accordance with claim 2 wherein the polymeric thin film comprises a polymer with a main chain polyvinyl structure.

6. A waveguide device in accordance with claim 2 wherein the polymeric thin film comprises a polymer with a main chain polysiloxane structure.

7. A waveguide device in accordance with claim 2 wherein the polymeric thin film comprises a polymer with a main chain polyoxyalkylene structure.

8. A waveguide device in accordance with claim 2 wherein the polymeric thin film comprises a polymer with a main chain polyester or polyamide structure.

9. A waveguide device in accordance with claim 2 wherein the polymeric thin film comprises a polymer which is characterized by a recurring monomeric unit corresponding to the formula:

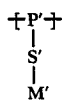

where P' is a polymer main chain unit, S' is a flexible spacer group having a linear chain length of between about 0-20 atoms, M' is a pendant group which exhibits second order nonlinear optical susceptibility, and where the pendant side chains consist of at least about 25 weight percent of the polymer, and the polymer has a glass transition temperature above about 40° C.

10. A waveguide device in accordance with claim 9 wherein the M' group contains a biphenyl structure.

11. A waveguide device in accordance with claim 9 wherein the M' group contains a stilbene structure.

12. A frequency converting module for producing a short wavelength laser beam which comprises: a. a 700-1300 nm laser generating source, in coupled combination with b. an optical waveguide comprising a substrate-supported thin film of a polymeric medium which exhibits second order nonlinear optical response, and which has a spatial periodic structure for quasi-phase matching of propagating wave energy; wherein the coherence length $l_c$ of the periodic polymeric medium is defined by the equation:

$$l_c = (\pi/\Delta\beta)$$

where $\Delta\beta$ is the propagation constant difference which is equal to $\beta_o(2\omega_1) - 2\beta_o(\omega_1)$, $\omega_1$ is the fundamental frequency, and subscript zero denotes the zero-ordered mode in the waveguide; and wherein the polymeric medium comprises a polymer having side chains which exhibit second order nonlinear optical susceptibility and consist of at least 25 weight percent of the polymer, and the side chains have an external field-induced molecular orientation orthogonal to the waveguide plane.

13. A frequency converting module in accordance with claim 12 wherein the optical waveguide component has a two-dimensional channel structure for single mode wave transmission.

14. A process for providing a short wavelength laser source which comprises (1) introducing a 700-1300 nm laser beam into an optical waveguide comprising a substrate-supported thin film of a polymeric medium which exhibits second order nonlinear optical response, and which has a spatial periodic structure for quasi-phase matching of propagating wave energy; wherein the coherence length $l_c$ of the periodic polymeric medium is defined by the equation:

$$l_c = (\pi/\Delta\beta)$$

where $\Delta\beta$ is the propagation constant difference which is equal to $\beta_o(2\omega_1) - 2\beta_o(\omega_1)$, $\omega_1$ is the fundamental frequency, and subscript zero denotes the zero-ordered mode in the waveguide; and wherein the polymeric medium comprises a polymer having side chains which exhibit second order nonlinear optical susceptibility and consist of at least 25 weight percent of the polymer, and the side chains have an external field-induced molecular orientation orthogonal to the waveguide plane; and (2) doubling the frequency of the propagating wave energy to provide an output 350-650 nm laser beam.

15. A process in accordance with claim 14 wherein the input laser beam is in a transverse magnetic (TM) polarization mode.

16. A process in accordance with claim 14 wherein the input laser beam power is between about 0.1-1 watt, and the output laser beam power is at least about one milliwatt.

17. A process in accordance with claim 14 wherein the propagating mode of the input wave energy is zero-ordered.

18. A process in accordance with claim 14 wherein the waveguide polymeric thin film exhibits a second order nonlinear optical susceptibility $\chi^{(2)}$ of at least about $1 \times 10^{-8}$ esu.

19. A process in accordance with claim 14 wherein the waveguide polymeric thin film comprises a polymer which is characterized by a recurring monomeric unit corresponding to the formula:

where P' is a polymer main chain unit, S' is a flexible spacer group having a linear chain length of between about 0–20 atoms, M' is a pendant group which exhibits second order nonlinear optical susceptibility, and where the pendant side chains consist of at least about 25 weight percent of the polymer, and the polymer has a glass transition temperature above about 40° C.

20. A process in accordance with claim 19 wherein the M' group contains a biphenyl structure.

21. A process in accordance with claim 20 wherein the M' group contains a stilbene structure.

22. A process in accordance with claim 14 wherein the waveguide polymeric thin film comprises a polymer which is characterized by a recurring monomeric unit corresponding to the formula:

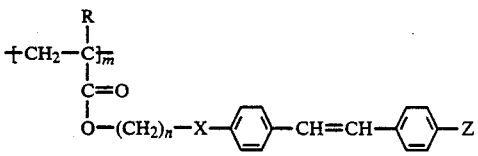

where m is an integer of at least 5; n is an integer between about 4–20; X is —NR—, —O— or —S—; R is hydrogen or a $C_1$-$C_4$ alkyl; and Z is —$NO_2$, —CN or —$CF_3$.

23. A process in accordance with claim 22 wherein the polymer exhibits liquid crystalline properties.

* * * * *